United States Patent [19]
Christopherson

[11] Patent Number: 5,306,559
[45] Date of Patent: Apr. 26, 1994

[54] POLYMERIC FILMS
[75] Inventor: Roy Christopherson, Swindon, England
[73] Assignee: Courtaulds Films (Holdings) Ltd., United Kingdom
[21] Appl. No.: 71,491
[22] Filed: Jun. 4, 1993
[30] Foreign Application Priority Data
  Jun. 5, 1992 [GB] United Kingdom ............... 9211938
[51] Int. Cl.$^5$ .............................................. B32B 7/12
[52] U.S. Cl. ................................. 428/349; 428/500; 428/516; 428/910
[58] Field of Search ............... 428/349, 500, 516, 910
[56] References Cited
  U.S. PATENT DOCUMENTS
  Re. 31,269  6/1983  Andrews et al. .................. 428/516
  4,294,882  10/1981  Andrews et al. .................. 428/439
  4,845,189   6/1989  Rudd et al. ...................... 528/272
  4,921,764   5/1990  Rudd et al. ...................... 428/480

FOREIGN PATENT DOCUMENTS
  0009340   4/1980  European Pat. Off. ........ C08J 5/18
  0323599  12/1988  European Pat. Off. ........ C09D 3/64
  2040799   3/1980  United Kingdom ......... B32B 27/08

*Primary Examiner*—Edith Buffalow
*Attorney, Agent, or Firm*—Bacon & Thomas

[57] ABSTRACT

Biaxially oriented polymeric film having a core layer comprising a propylene homopolymer; a first heat sealable layer on one surface of the core layer and including an ionic hydrocarbyl sulfonate and a non-silica, non-migratory slip and/or antiblock agent; and a second heat sealable layer on the other surface of the core layer and including a non-migratory slip and/or antiblock agent but substantially no ionic hydrocarbyl sulfonate have good antistatic properties combined with good slip/antiblock properties.

6 Claims, No Drawings

POLYMERIC FILMS

This invention concerns polymeric films and more particularly polymeric films having good slip combined with antistatic properties.

British Patent Specification 2040799 describes biaxially stretched heat sealable antistatic polypropylene films consisting of a base layer of polypropylene with at least one heat seal layer thereon, the heat seal layer consisting of a heat sealable olefinic polymer containing between 0.2 and 10 percent by weight of an anionic hydrocarbyl sulfonate. The hydrocarbyl sulfonate in the heat seal layer provides the heat seal layer with antistatic properties, and the slip properties of the heat seal layer can be improved by the inclusion of 0.05 to 5.0 percent by weight of a slip agent, for example oleamide. The use of anionic hydrocarbyl sulfonates in the heat seal layers of these prior art films had the advantage that they avoided the necessity for corona discharge treatment of the heat seal layer which was necessary to activate previously used non-ionic antistatic agents such as ethoxylated alkylamines, ethoxylated agents such as ethoxylated alkylamines, ethoxylated alkyl amides or glyceryl esters, as the treatment had the undesirable effect of increasing the heat seal threshold of the heat seal layer.

Although the presence of anionic hydrocarbyl sulfonates in the heat seal layers of polymeric films imparts good antistatic properties to the films, it has been found to reduce the effects of corona discharge treatment. As a result, when such films are subjected to printing, film wetability and print adhesion are often reduced compared with corona discharge treated films using a non-ionic surface active agent. The reduced printability resulting from the substitution of non-ionic antistatic agents by anionic hydrocarbyl sulfonates is a distinct disadvantage of such films even though it does provide the films with antistatic properties without reducing the heat seal threshold of the heat seal layers.

According to the present invention there is provided a biaxially oriented polymeric film comprising
(a) a core layer comprising a propylene homopolymer;
(b) a first heat sealable layer on one surface of the core layer and including an ionic hydrocarbyl sulfonate and a non-silica, non-migratory slip and/or antiblock agent; and
(c) a second heat sealable layer on the other surface of the core layer and including a non-migratory slip and/or antiblock agent but substantially no ionic hydrocarbyl sulfonate.

Films according to the present invention have shown good antistatic properties combined with good slip/antiblock properties, particularly for the surface defined by the first heat sealable layer containing the ionic hydrocarbyl sulfonate, the second heat sealable layer having good printability following corona discharge treatment.

Although the core layer need not contain additives which affect the surface characteristics of the films, it is generally preferred to include at least one slip additive in the core layer. It has been surprisingly found that the amount of such additives in the core layer can be reduced compared with hitherto whilst imparting improved slip, particularly to the second heat sealable layer. This has the particular advantage of enabling additive concentrations within the films to be reduced compared with hitherto, for example to conform to more stringent regulations governing the contact of foodstuffs with packaging materials, whilst providing the heat sealable layer not containing an ionic hydrocarbyl sulfonate with good slip properties. Examples of additives which can be present in the core layer to improve the surface characteristics of the second heat sealable layer include long chain fatty acid amides, e.g. erucamide or oleamide, bis-ethoxylated alkylamines, and glyceryl esters e.g. glycerol mono-stearate.

Films in accordance with the present invention will usually contain a bis-ethoxylated alkylamine, and it is generally preferred to use such amines having a lower volatility than that of such amines which have been used hitherto. Bis-ethoxylated alkylamines are usually derived from naturally occurring alkylamines, and as a result they usually consist of a mixture of compounds containing a range of numbers of carbon atoms in the alkyl groups thereof. Particularly preferred bis-ethoxylated alkylamines for use in films of the present invention, by virtue of their low volatility and low rate of migration from the core layer, have an average alkyl chain length in the range of from 14 to 18 carbon atoms composed, for example, with such amines containing an average chain length in the range of from 12 to 14 carbon atoms. It is generally preferred that the bis-ethoxylated amines exhibit a volatility corresponding to a weight loss of less than 2 percent, more preferably less than 1 percent, when heated at 160° C. for 30 minutes at a pressure of 600 millibar.

Although as will be appreciated by those skilled in the art, the amount of a bis-ethoxylated alkylamine which can be present in the core of a film in order to provide the outer surface of the film with particular properties can be varied widely, particularly depending on the overall film thickness, the present invention typically enables the amount of bis-ethoxylated alkylamine to be reduced by a half or more for a given film thickness, whilst at the same time imparting substantially the same level of antistatic effect of the second heat sealable layer. It is therefore preferred for a film in accordance with the invention having an overall thickness of about 20 microns to include up to 0.12 percent, more preferably up to 0.08 percent, of a bis-ethoxylated alkylamine.

Similar reductions in the amounts of long chain fatty acid amides can be effected compared with levels proposed hitherto, for example as little as 25 percent of the amount of such amides as have been used hitherto can be used to provide a comparable level of slip compared with balanced films not having an ionic hydrocarbyl sulfonate in either heat sealable layer. Typical concentrations of long chain fatty acid amides which can be used are less than 0.2 percent, and preferably less than 0.16 percent.

Films in accordance with the present invention can include a glyceryl ester in the core layer, such esters being used for example to aid migration of additives in the core layer, but the second heat sealable layer can usually be provided with satisfactory slip/antiblock and antistatic properties without such esters being present in the core. The ability to omit such esters from films of the present invention has the advantage that undesirable effects such as blooming caused by a build up of core additives on the film surface can be avoided.

The ionic hydrocarbyl sulfonate used in the first heat sealable layer is preferably an alkyl sulfonate, for example containing at least ten carbon atoms, e.g. from 12 to 18 carbon atoms, the alkyl sulfonates preferably being used in the form of an alkali metal salt thereof, e.g. a sodium salt thereof. The amount of ionic hydrocarbyl sulfonate which is used is preferably from 0.3 to 2.0 percent by weight of the first heat seal layer.

The first and second heat sealable layers can be produced from a variety of heat sealable polymers, polymers derived from olefins being preferred. As will be appreciated by those skilled in the art, the heat sealable polymer used for the first heat sealable layer can be the same as or different from that used for the second heat sealable layer.

Heat sealable polymers which can be used include polymers and copolymers derived from one or more of ethylene, propylene, but-1-ene and alkenes containing more than four carbon atoms, for example polyethylenes including low density and linear low density polyethylenes, and copolymers of propylene with ethylene and/or but-1-ene. Preferred polymers for the first heat sealable layer include copolymers of propylene with ethylene containing from 2 to 6 percent by weight of units derived from ethylene. The first heat sealable layer contains a non-silica, non-migratory slip and/or antiblock agent. Silica is to be avoided since it tends to reduce the anti-static properties imparted by the ionic hydrocarbyl sulfonate. Examples of non-silica slip and/or antiblock agents include phase distinct organic polymers, for example polyamides. The amount of non-silica slip and/or antiblock agent present is preferably from 0.1 to 20 percent by weight of the first heat sealable layer.

The second heat sealable layer is preferably printable, and the second heat sealable layer can therefore be formed from an inherently printable polymer or from a polymer which can be rendered printable or more printable, for example by flame treatment or by corona discharge treatment. Preferred polymers for the second heat sealable layer include the preferred polymers for the first heat sealable layer, such propylene ethylene copolymers in general requiring a surface treatment to increase their printability, corona discharge treatment being preferred. The second heat sealable layer contains a non-migratory slip and/or antiblock agent, for example silica or an organic slip and/or antiblock agent as proposed for use in the first heat sealable layer.

The core layer can be voided or non-voided. In addition, films in accordance with the present invention can include one or more additional layers which may be voided. Voiding can be effected for example in known manner, e.g. using an organic or inorganic voiding agent. However, if voided layers are present, it may be necessary to increase the amount of bis-ethoxylated alkylamine compared with non-voided films in order to achieve desired surface concentrations thereof.

Films in accordance with the present invention can be produced in a wide range of thicknesses, films for packaging purposes generally being from 15 to 55 $\mu$m thick. The heat sealable layers are preferably up to 5 $\mu$m thick, although they will usually be at least 0.5 $\mu$m thick in order to provide adequate heat sealing. A preferred range of thicknesses for the heat sealable layers is from 0.5 to 2 $\mu$m. The core layer will, in general, form the remainder of the thickness of the films.

Films in accordance with the present invention can be produced by known methods. However, it is generally preferred to produce these films by coextruding the two heat sealable layers and the core layer through a slot die to produce a flat polymer web which is stretched first in the direction of extrusion using heated rollers rotating at different peripheral speeds and then in the transverse direction using a stenter oven. When a surface treatment is required, for example to increase the printability of the films, it is preferably effected after stretching the polymer web in the transverse direction and before the resulting film is wound up. As will be appreciated, the various additives in the respective layers are preferably incorporated using a master-batch method.

The following Examples are given by way of illustration only. All parts are by weight unless stated otherwise.

EXAMPLE 1

A three layer polymer web was produced by coextruding through a slot die a core layer of propylene homopolymer containing 0.16 percent of erucamide and 0.08 percent of a bis-ethoxylated alkylamine (average alkyl chain length between 12 and 14 carbon atoms - volatility of 0.5 percent as evaluated by the weight loss resulting from heating a sample at 160° C. for 30 minutes in a vacuum oven at a pressure of 600 millibar) with a first layer of a propylene/ethylene random copolymer 4 percent of units derived from ethylene) containing 2.0 percent of sodium alkyl sulfonate of mean molecular weight 328 and 0.3 percent of nylon 12 on one surface of the core and a second layer of the copolymer used for the first layer but containing 0.1 percent of silica on the other surface of the core.

The three layer web was then stretched 4.5 times in the direction of extrusion using heated rollers at 120° C. and thereafter 10 times in the transverse direction using a stenter oven at 160° C. The resulting biaxially stretched film was cooled, and the layer of copolymer containing the silica was corona discharge treated to a surface energy of 42 dynes before the film was wound up.

The resulting film had an overall thickness of 20 $\mu$m, each outer layer being 0.8 $\mu$m thick.

The surface of the film containing the sodium alkyl sulfonate had a slip coefficient at doff of greater than 3.0 (Davenport Dynamic slip—BS 2782 No 311A—film to metal) and its surface resistance was $<10^{13}$ ohms/square. The other surface of the film was satisfactorily printable.

EXAMPLE 2 (COMPARISON)

A three layer film was produced by a method analogous to that described in Example 1, except that the sodium alkyl sulfonate and the nylon were omitted from the first layer and replaced by 0.1 percent by weight of silica based on the weight of the first layer. The amount of the additives in the core layer were unaltered.

At doff, the slip coefficient of the non-treated face was less than 2.0 (BS 2782 No 311A—film to metal) and its surface resistance was greater than $10^{13}$ ohm/square.

I claim:
1. A biaxially oriented polymeric film comprising
   (a) a core layer comprising a propylene homopolymer;
   (b) a first heat sealable layer on one surface of the core layer and including an ionic hydrocarbyl sulfonate and a non-silica, non-migratory slip or antiblock agent; and
   (c) a second heat sealable layer on the other surface of the core layer and including a non-migratory slip or antiblock agent but substantially no ionic hydrocarbyl sulfonate.

2. A film according to claim 1, wherein the ionic hydrocarbyl sulfonate comprises an alkyl sulfonate.

3. A film according to claim 1, wherein the said non-silica, non-migratory slip or antiblock agent comprises an organic polymer.

4. A film according to claim 3, wherein the said organic polymer comprises a nylon.

5. A film according to claim 1, wherein the said core layer contains a bis-ethyoxylated alkylamine.

6. A film according to claim 1, wherein the said core layer contains a glyceryl ester.

* * * * *